No. 875,425.                                         PATENTED DEC. 31, 1907.
J. H. GILLIES.
APPARATUS FOR LEACHING ORES AND THE SUBSEQUENT SEPARATION
OF THE LIQUIDS FROM THE SOLIDS.
APPLICATION FILED AUG. 20, 1906.
3 SHEETS—SHEET 1.
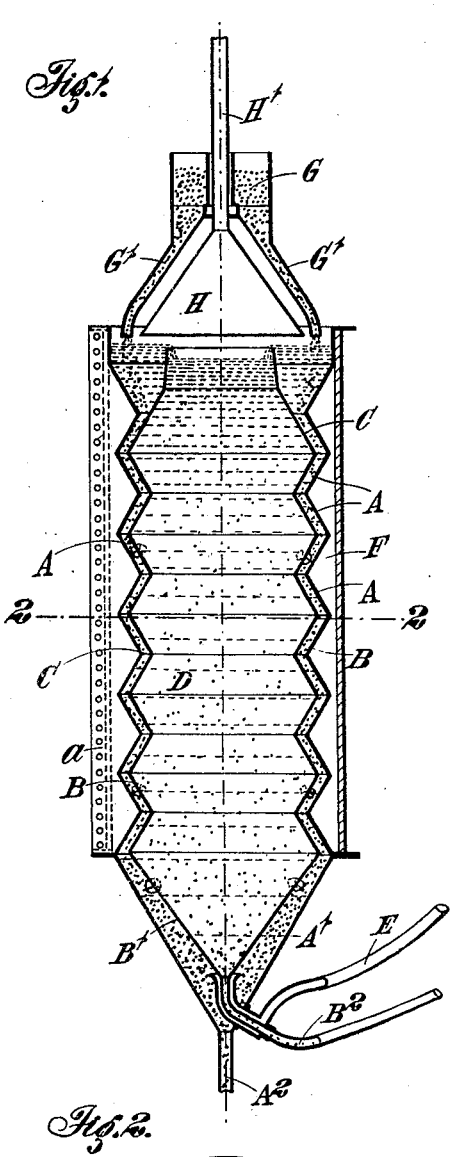
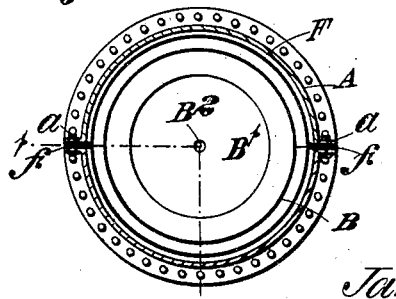
Witnesses.
Inventor
James Hyndes Gillies.
By
James L. Norris.
Atty.

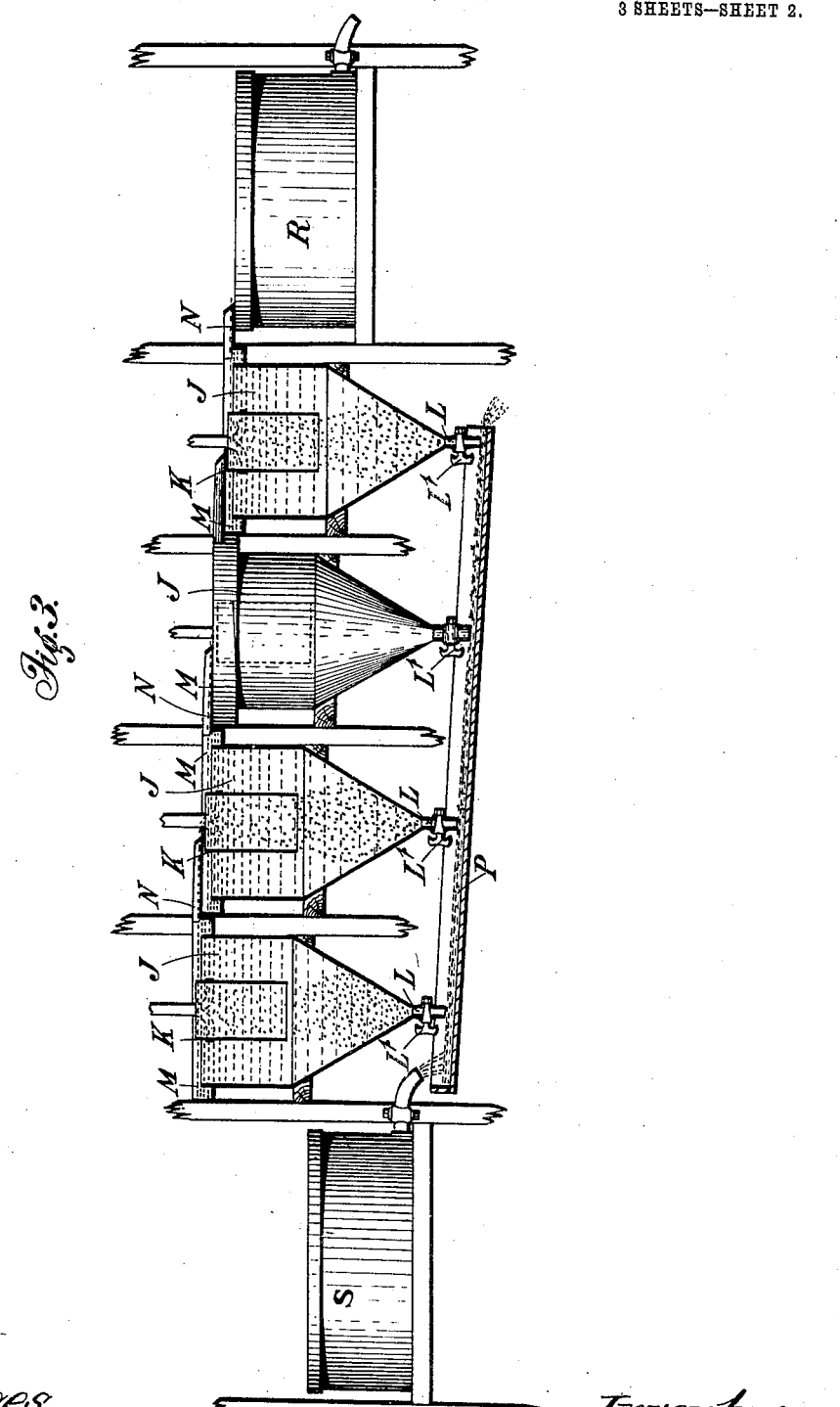

No. 875,425. PATENTED DEC. 31, 1907.
J. H. GILLIES.
APPARATUS FOR LEACHING ORES AND THE SUBSEQUENT SEPARATION
OF THE LIQUIDS FROM THE SOLIDS.
APPLICATION FILED AUG. 20, 1906.
3 SHEETS—SHEET 3.
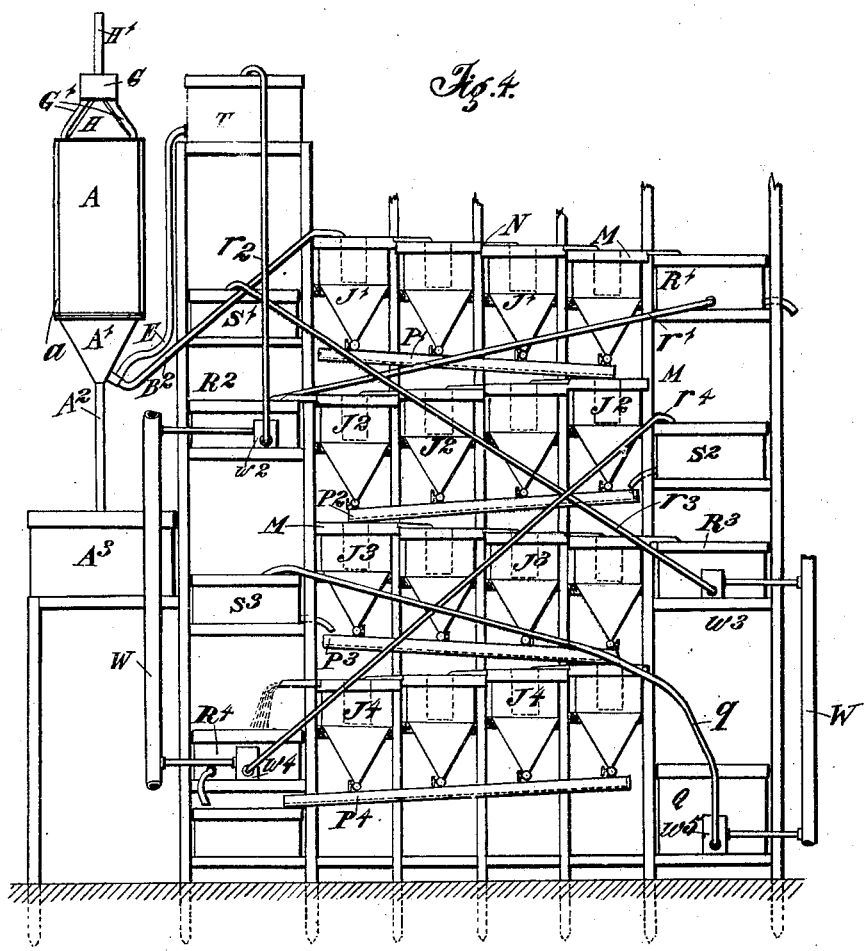

UNITED STATES PATENT OFFICE.

JAMES HYNDES GILLIES, OF AUBURN, VICTORIA, AUSTRALIA.

APPARATUS FOR LEACHING ORES AND THE SUBSEQUENT SEPARATION OF THE LIQUIDS FROM THE SOLIDS.

No. 875,425.　　　　Specification of Letters Patent.　　　　Patented Dec. 31, 1907.

Application filed August 20, 1906. Serial No. 331,376.

*To all whom it may concern:*

Be it known that JAMES HYNDES GILLIES, a citizen of the Commonwealth of Australia, residing at "Mia Mia," Riversdale Road, Auburn, in the State of Victoria, Commonwealth of Australia, mining engineer, have invented a certain new and useful Improved Apparatus or Plant for the Leaching of Ores or Metallurgical Products and the Subsequent Separation of the Liquids from the Solids, of which the following is a specification.

My invention relates to an improved apparatus or plant for the leaching or other treatment of ores or metallurgical products with solutions and also to the subsequent separation of the liquids from the solids.

My invention refers more particularly to an apparatus for leaching zinc ores with sulfuric acid and the subsequent separation of the slimes and solids from the solutions of zinc sulfate, but though hereindescribed as applicable to this particular process, it will be well understood that it is equally applicable to other processes in which ores or metallurgical products are leached with liquids or solutions.

Leaching operations are at present for the most part effected in vats by downward percolation, the solutions being drawn off through a false bottom. Difficulty is often experienced however and particularly when leaching with acid solutions by the tendency of the slimes and other solids to agglomerate and cake in the bottom of the vat due for the most part to the formation of gelatinous silica and the rehydration of the sulfates formed in the roasting.

The object of this invention is to provide an apparatus or plant in which a continuous stream of ore or metallurgical products is brought into contact with an opposing stream of leaching liquid effecting the solution of the soluble mineral particles and soluble salts continuously without any settlement, the liquids and solids being subsequently likewise separated while continuously flowing. I accomplish this object by providing an apparatus of novel construction and an arrangement of parts for the leaching of ores and the separation of the liquids and solids forming a complete plant as hereinafter described.

My improved apparatus consists of a double walled vessel forming an annular space surrounding an internal space, the liquors being caused to flow upwards in this annular space, and the ore and metallurgical products downwards therein, the solutions together with the finer particles and slimes carried by the current being withdrawn at the top of the said annular space into the internal space, while the gangue and insoluble coarser solids are withdrawn from bottom of the said annular space. I also provide a number of separator vessels arranged in series, the liquors from one overflowing into the other, together with means whereby the solids in their passage between each series are subjected to a washing operation by solutions obtained from the lower series of separator vessels to bring the solutions delivered from the upper series of separator vessels up to a higher state of concentration, and also at the same time maintain the same bulk of liquid in circulation.

In order that my invention may be the better understood, I will now proceed to describe the same by reference to the accompanying drawings, in which—

Figure 1 is a vertical sectional elevation, (line 1—1, Fig. 2) and Fig. 2 is a plan in section (line 2—2 Fig. 1) of my improved leaching apparatus. Fig. 3 is an elevation partly in section of one series or group of separator vessels. Fig. 4 is an elevation of the complete plant.

My improved apparatus consists of a double walled vessel preferably cylindrical in shape formed with an outer wall A and an inner wall B. These two walls A and B form together an annular space C surrounding an internal space D. The walls A and B are also stepped in form, that is to say, they are zigzag in vertical section. At the bottom, these walls A and B are continued in the form of inverted cones $A^1$ and $B^1$ respectively, as shown in Fig. 1. The outer wall $A^1$ is provided with a discharge pipe $A^2$ having a controlling cock or plug of usual construction for the discharge of the coarser solids and insoluble particles and gangue from the annular space C. The inner wall $B^1$ is provided with a discharge pipe $B^2$ leading out through the outer wall $A^1$ for the discharge of the solutions of soluble salts and slimes and finer particles carried therewith from the internal space D.

An inlet pipe E for the leaching liquor is provided at the bottom of the vessel passing in through the outer wall A preferably surrounding the discharge pipe B² and delivering into the annular space C, the bottom of the cone B¹ forming a distributer for the liquors as shown.

The walls A and B of the vessel and the various pipes are constructed of material not acted upon by the solutions, and when leaching with acids of acid-resisting material such as regulus metal or hardened lead. The stepped portion of the vessel around the annular space C¹ is provided with a steam jacket F for the maintenance of a higher temperature when it is required. In constructing this vessel of regulus material or the like when used for leaching with acid solutions, the outer wall A is cast in hemispherical sections with flanges $a$ clamped between the flanges $f$ of the sheeting F of the steam jacket. At the top of the vessel is provided a hopper G preferably adapted to rotate and having feed arms G¹ delivering the material into the annular space C. A hood H is also provided having an upwardly projecting pipe H¹ (forming the shaft for the hopper G) whereby the fumes from the leaching operation may be conducted away.

In operation, the ore or metallurgical products are fed in from the hopper into the annular space C into the bottom of which at the same time the leaching liquors are introduced by means of the pipe E. The descending ore meets the upwardly flowing current of leaching liquors in the annular space C and falling downward from step to step being in prolonged contact the soluble salts are dissolved, and the solutions thereof rise and flow over the upper edge of the inner wall B into the internal space D together with any slimes or fine particles carried therewith. The solutions with these slimes and fine particles are withdrawn from the internal space D by means of the pipe B² and subsequently treated in separator vessels as hereinafter described for the separation of the liquids from the solids. The gangue and coarser particles passing downwards in the annular space C are withdrawn from the bottom thereof by means of the pipe A² into the sump A³.

It will be seen that the above-described vessel is usable for separation only without leaching. In this case the ore—with or without admixture of separating medium—is fed in to the annular space C and meets an opposing upwardly moving current. The particles carried upwardly by this current are delivered over the edge of the wall B into the internal space D and from there withdrawn while the other particles not affected by the current sink to the bottom of the annular space C and are withdrawn by the opening A².

The solutions and slimes and finer products delivered from the internal space D of the vessel A by means of the pipe B² are discharged into the highest or uppermost of the settling or separator vessels. These separator vessels are arranged in groups or series one above the other at different levels in such way that the products of one series may flow directly into the other. One series or group is shown in Fig. 3 while a plant of four series or groups is shown in Fig. 4. I will first describe one series or group as shown in Fig. 3. These separator vessels may be either of inverted pyramidal or conical shape similar to ordinary settling boxes or "spitzkasten", or their upper portions may be rectangular or cylindrical surmounting an inverted pyramid or cone. These vessels J may be provided with a vertical baffle plate upon the side upon which the liquors enter or are constructed preferably as shown with a central open cylinder K into which the solutions and slimes are delivered. Each vessel J is also provided with a discharge opening L at the bottom having a control cock L¹ and an annular lip or launder M at the top. From this lip or launder M is a chute N discharging into the cylinder K of the vessel next below it in series. Between each series or group of separator vessels J is a launder P adapted to receive the solids in the form of sludge, as delivered from the bottom of that particular series or group of separator vessels as discharged from the openings L; while at the head of each launder P is a sump or tank S for providing wash water or weak solution as hereinafter described. At the lower end of each series or group of separator vessels is a sump or tank R adapted to receive the solutions overflowing from the lip or launder M of the last vessel. This form of separator vessel J affords a maximum amount of settling area, the solutions and slimes to be separated being delivered into the cylinder K with the least possible agitation and the overflow of the clear solutions is effected around the whole of the top edge into the lip or launder M.

Referring now to Fig. 4, I will describe a plant of separator vessels arranged according to my invention on which there are four series or groups. It will however be well understood that any number of series or groups may be arranged as is found necessary in practice, the same principle being involved. Furthermore, each series or group may contain as many rows of vessels in the same plane as may be necessary according to the capacity of the plant and the sumps or tanks may be extended sufficiently to receive the whole of the discharge of the one series or group. In Fig. 4 four series or groups are shown, the vessels in the first or upper group being designated J¹, in the second J², in the third J³ and in the fourth J⁴, and similarly the launders for the discharge of the sludge are designated P¹, P², P³ and P⁴ respectively, the sumps or tanks for the receipt of the clear solutions R¹, R², R³ and R⁴ respectively, and the washing tanks S¹, S² and S³ respectively, there being no washing tank for the last or lowermost launder P⁴. A solution tank T is provided at a suitable level and connected with the pipe E so that sufficient head of solution may be obtained to allow of a flow through the leaching vessel. A tank Q for wash water is provided shown herein at the bottom of the plant, but in practice arranged in any convenient position, or the letter Q may simply designate the source of water supply.

Each of the tanks R¹, R², R³ and R⁴ is provided with a pipe $p^1$, $p^2$, $p^3$ and $p^4$ respectively for delivering their solutions received from the separator vessels in directions as hereinafter described. Each of the pipes $p^2$, $p^3$ and $p^4$ is provided with means for raising the solutions, such as air lifts $w^2$, $w^3$ and $w^4$ of any known construction connected to pipes W containing compressed air. The wash water tank Q is shown with a pipe $q$ having an air lift $w^5$ connected to the pipe W containing compressed air.

The solutions and slimes coming from the leaching vessel A flow by means of the pipe B² into the first vessel of the first series or group of separators J¹, and the solids settle down at the bottom thereof while the liquors overflow from one to the other and finally into the sump R¹ at the end of the series. The sludge delivered from the vessels J¹ flows down the launder P¹ into the next series of separators J² and is subjected to a washing operation in the launder P¹ by a weak solution from the sump S¹ obtained as hereinafter described. This wash solution may be introduced into the bottom of the vessels J¹ to assist in the delivery of the sludge. The sludge from each series flows down the launders P¹, P², P³ and P⁴, where it is washed with weak solutions or water from the washing sumps S¹, S² and S³, and then into the separator vessels of the next series, clear solutions being collected in the tanks or sumps R¹, R² R³ and R⁴. These operations are repeated as many times as there are series or groups in the plant.

In order to allow of the weaker solutions being sent back for rewashing until sufficiently rich in soluble salts, the series or groups of separators and sumps are arranged and connected in a special manner as hereinafter described, the object being to maintain the same bulk of liquids by replenishing to the extent of the amount withdrawn in concentrated or saturated solutions. The receiving sump R¹ of the separators J¹ of series or pump No. 1 contains the stronger concentrated solution of soluble salts, in some cases to the extent of saturation. The receiving sumps R³ and R⁴ of the lower series or groups of separators Nos. 3 and 4 contain gradually weaker solutions and are returned back again to the washing sumps in order to bring them to a higher point of concentration. This is effected by returning the stronger solutions to the washing sumps in the higher series or groups (where the sludge would be obviously richer in soluble salts) while the weaker solutions are returned to the lower series or groups (where the sludge would be obviously poorer in soluble salts). In carrying out this principle the receiving sump R¹ of series or group No. 1 contains the concentrated or saturated solution sought, or if not sufficiently rich in salts is connected by means of the pipe $p^1$ to the second receiving sump R². The liquor in the receiving sump R² is returned by means of the pipe $r^2$ to the storage tank T for the leaching operation described in the first place. The receiving sump R³ is connected by means of the pipe $r^3$ to the washing sump S¹. The receiving sump R⁴ is connected by means of the pipe $r^4$ to the washing sump S². The washing sump S³ is replenished with wash water by means of the pipe $q^1$ from the tank Q while no washing would be effected upon the sludge in the launder P⁴ of the lowermost series or group of separators. The wash water added to the washing sump S³ is arranged to be in such quantity as to replenish the amount of liquid withdrawn in the receiving sump R¹, and thus the bulk of solutions is maintained and the cycle of operations continued.

I claim:—

1. In an apparatus for the leaching of ores or metallurgical products and the separation of the liquids from the solids, a double walled vessel forming an annular space surrounding an internal space and having separate means of discharge from the bottom of the said annular space and from the bottom of the said internal space, and means for the inflow of solution into the bottom of the said annular space, substantially as described.

2. In an apparatus for the leaching of ores or metallurgical products and the separation of the liquids from the solids, a double walled vessel forming an annular space surrounding an internal space having means for feeding the ore or metallurgical products into the top of the said annular space and from the bottom of the said internal space, and an inlet for solution in the bottom of the said annular space.

3. In an apparatus for the leaching of ores or metallurgical products and the separation of the liquids from the solids, the combination with a double walled vessel forming an annular space surrounding an internal space, the said walls being stepped or zigzag in vertical section and shaped as inverted cones at the bottom, of a discharge pipe from the bottom of the said annular space and a discharge pipe from the bottom of the said internal space, and an inlet pipe for solution leading into the bottom of the annular space, substantially as described.

4. In an apparatus for the leaching of ores or metallurgical products and the separation of the liquids from the solids, the combination with a double walled vessel forming an annular space surrounding an internal space, the said walls being of corrosive-fluid-resisting material, the outer wall being constructed in sections having flanges, of a casing surrounding the said outer wall having flanges between which the flanges of the said outer wall are bolted, substantially as described.

5. In an apparatus for the leaching of ores or metallurgical products, and the separation of the liquids from the solids, the combination with a double walled vessel forming an annular space surrounding an internal space, having means for the discharge from the bottom of the said annular space, and from the bottom of the said internal space, and an inlet pipe into the bottom of the annular space, of a steam jacket surrounding the outer wall of the said vessel, substantially as described.

6. In an apparatus for the leaching of ores or metallurgical products and the separation of the liquids from the solids, the combination of an outer stepped wall (such as A), an inner stepped wall (such as B), a steam jacket (such as F) forming an annular space (such as C) and an internal space (such as D) of a pipe (such as E) for the inflow of solution into the bottom of the said annular space, and discharge pipes (such as $A^2$ and $B^2$) leading out from the bottom of the said annular space and the said internal space respectively, all forming a vessel substantially as described, and as shown in the drawings.

In testimony whereof I have hereunto set my hand in presence of two subscribing witnesses.

JAMES HYNDES GILLIES.

Witnesses:
CLEM. A. HACK,
PERCY HEDGES.